United States Patent [19]
Leffert et al.

[11] Patent Number: 4,726,235
[45] Date of Patent: Feb. 23, 1988

[54] ULTRASONIC INSTRUMENT TO MEASURE THE GAS VELOCITY AND/OR THE SOLIDS LOADING IN A FLOWING GAS STREAM

[75] Inventors: Charles B. Leffert, Troy; Leo H. Weisman, Warren, both of Mich.

[73] Assignee: Available Energy, Inc., Detroit, Mich.

[21] Appl. No.: 839,033

[22] Filed: Mar. 12, 1986

[51] Int. Cl.$^4$ .............................................. G01F 1/74
[52] U.S. Cl. ............................ 73/861.04; 73/861.26
[58] Field of Search ........... 73/861.04, 861.26, 861.27, 73/861.28, 861.02, 861.03

[56] References Cited

U.S. PATENT DOCUMENTS

| | | |
|---|---|---|
| 3,178,940 | 4/1965 | Dahlke et al. . |
| 3,204,457 | 9/1965 | Howatt . |
| 3,741,014 | 6/1973 | Tamura . |
| 4,007,754 | 2/1977 | Beck et al. . |
| 4,164,865 | 8/1979 | Hall et al. .......................... 73/861.28 |
| 4,176,337 | 11/1979 | Aechter et al. . |
| 4,183,244 | 1/1980 | Kohno et al. . |
| 4,300,400 | 11/1981 | Bistrian, Jr. et al. . |
| 4,336,808 | 6/1982 | Ohno et al. . |
| 4,391,149 | 7/1983 | Herzl . |
| 4,475,406 | 10/1984 | Ansaldi et al. . |
| 4,478,072 | 10/1984 | Brown . |
| 4,483,202 | 11/1984 | Ogura et al. ....................... 73/861.27 |
| 4,501,156 | 2/1985 | Kretschmer et al. . |
| 4,509,373 | 4/1985 | Brown . |
| 4,512,200 | 4/1985 | Ghering et al. . |

FOREIGN PATENT DOCUMENTS 2160920 6/1973 Fed. Rep. of Germany ... 73/861.26

OTHER PUBLICATIONS

Raptis et al., "Ultrasonic Properties of Coal Slurries & Flow Measurements by Cross-Correlation", in IEEE Trans. on Sonics & Ultrasonics, vol. SU-28, #4, 7/81, pp. 248–256.
Leffert et al., "Mass Flow Rates in Coal-Air Ducts", paper given to Midwest Univ. Energy Consortium, 4/3, 4/84.
Lefert et al., "Ultrasonic Technique for Coal Mass Flow Measurements & Coal Fineness Determination", paper submitted to EPRI, 10/23-25/84, Wash., D.C.
Hamade, "Ultrasound Attenuation in Pipe Flow of Turbulent Gas & Suspended Solids", Ph.D. Thesis, Wayne State University, 9/82, CEEC Report 82-1.

Primary Examiner—Herbert Goldstein
Attorney, Agent, or Firm—Harness, Dickey & Pierce

[57] ABSTRACT

A flow meter (10) particularly adapted for measuring the mass flow rate of pulverized coal being introduced into large scale power generation boilers. The meter includes a transmitter (14) which generates a pulsed beam of ultrasonic impulses. A receiver (18) is positioned across the flow filed from the transmitter and receives the ultrasound pulses. The meter measures the downstream drift of the ultrasound pulses and their attenuation which is related to flow velocity and concentration, respectively. The instrument includes electronic circuitry (28) for automatically adjusting the relationship between transmitter and receiver, and performs numerical analysis routines on the signal outputted from the receiver to provide a signal related to coal concentration and velocity.

16 Claims, 13 Drawing Figures

ULTRASONIC INSTRUMENT TO MEASURE THE GAS VELOCITY AND/OR THE SOLIDS LOADING IN A FLOWING GAS STREAM

BACKGOUND OF THE INVENTION

This invention relates to an ultrasonic instrument for measuring the mass transport rate of solids suspended in a gas. More specifically, this invention relates to the transport of finely divided solids suspended in a gas in which an ultrasonic signal is used to measure both the solids loading in the gas and the average gas velocity to thereby determine the mass transport rate of the solids.

In coal-fired steam generators of the type typically used in the electric utility industry, coal is pulverized in mills and then transported pneumatically via heated primary air through burner feed lines to a number of burners within the steam generator henceforth referred to as a "boiler". The coal pulverizing mills vary in size, but for the larger boiler installations today, typical operation might involve a feed rate of about fifty tons per hour of coal and one hundred tons per hour of primary air to each mill. The feed coal (usually in lumps about one-half inch in diameter) is typically pulverized to about eighty percent through 200 mesh (74 micron) screen and then the coal-air mixture is blown out of the mill into a number of sixteen-inch diameter pipes which feed burners on the sides of the boiler. A large boiler might have seven such mills each feeding eight burner feed lines, thereby feeding a total of fifty-six burner feed lines.

A significant problem for large-scale coal fired boiler operation arises from non-uniform distribution of the pulverized coal into the burner feed lines. In the above example, one-eighth of the output from each coal mill should go into each of the feed lines. Presently, however, there is no reliable way to determine the actual coal distribution among the various burner feed lines. If a burner feed line transports too little coal causing the burner to burn lean, the boiler efficiency is degraded. If a burner feed line has too much coal causing the burner to burn rich, corrosion and fouling of the internal water tubes can occur which can reduce boiler efficiency and lead to costly shutdowns. In present practice, the primary air flow rate (without coal) is balanced with standard pitot-tube type flow meters which are removed before coal is added to the mill. Unfortunately, this method is inaccurate since it does not directly measure coal loading, and further, it suffers the disadvantage that continuous readings during boiler operation are not available.

In view of the foregoing, a reliable on-line instrument is certainly needed for measuring coal loading in boiler feed lines. Such an instrument could be used to provide an indication of coal loading to enable an operator to take appropriate steps or could be used to directly control coal loading. Development of such an instrument, however, poses serious design challenges due to the harsh flow conditions in burner feed lines since the gas velocity (approximately 30 m/sec) must be high to prevent the boiler flame from flashing back into the burner feed lines and the coal loading (approximately 0.5 kg coal/kg gas) makes a very abrasive medium in the highly turbulent gas stream.

Over the years, many instruments based on various physical phenomenon have been developed to measure fluid velocities in both single- and two-phase flow. In general, those instruments that have been successful have been used in relatively mild fluid environments as compared to the flow conditions for which the present invention is directed. The British have been working on the problem of measuring flow in boiler burner feed lines for about fifteen years. In one system that was developed and tested at a power plant site, the Doppler shift phenomena of an ultrasonic signal was used to determine the gas velocity in a burner feed line and the attenuation of a nuclear generated beam of Beta particles was used to determine the coal loading. A test of the instrument at the power plant site confirmed that the distribution of coal among the burner feed lines from the mill is, in fact, non-uniform. Unfortunately, that instrument package was judged to be not sufficiently reliable for commercial application.

The present inventors turned their attention toward the design of an instrument for measuring the mass flow rate of finely divided coal using ultrasonic waves to determine both gas velocity and solids loading. One of the characteristics of the high-velocity gas flow in a burner feed line in which a mass flow meter must operate that has made the development of an instrument so difficult in the past is the highly turbulent field generated at the high Reynold's Numbers (Re=500,000) which are found in burner feed lines. This characteristic also makes the task of measuring the received ultrasound signals difficult because the sound is scattered by the small eddies in the turbulent flow field. Not only do the turbulent eddies attenuate the strength of the sound arriving at the receiving transducer, but it also produces a highly fluctuating signal. Neither of these features facilitate the measurement of either the gas velocity or the solids loading.

Available Energy, Inc. and Detroit Edison Company of Detroit, Michigan, sponsored a study at Wayne State University from 1979 to 1985 of the physical phenomena present in a utility burner feed line. A mock-up of a full-scale (twelve-inch diameter) burner feed line was constructed in the shape of a sixty seven-foot long closed loop. Using mostly commercially available electronic instruments, ultrasonic signals were sent across the flowing gas stream to measure its interaction with the turbulence generated in the pipe and with suspended coal particles. This work led to a published PhD. thesis of Dr. Thomas A. Hamade of Wayne State University in 1982 entitled "Ultrasonic Attenuation in Pipe Flow of Turbulent Gas and Suspended Particles", which is hereby incorporated by reference and will be referred to henceforth as the "WSU-Thesis." The WSU-Thesis work demonstrated that an ultrasound signal could be sent across a large coal-laden gas stream and that the interaction of the sonic waves with the gas turbulence and with the suspended coal particles could be reasonably predicted from existing physical theory. This work also demonstrated that the average gas velocity could be obtained from the expected and well-known downstream drift of the sound signal. The full-scale experimental results were new and contributed to the understanding of turbulence and the interaction of sound with the turbulence and suspended coal particles. However, the transducer mounts, the off-the-shelf electronics, the methods of operating the transducers, and the methods of processing the received signal in combination did not constitute an "instrument" that would produce a readout of either the gas velocity or coal loading. The present invention provides the means to automatically readout on-line the gas velocity and/or coal loading from the interaction of ultrasound waves and the flowing medium thus providing an instrument suitable for commercial use. One embodiment of an instrument according to this invention would further provide a measurement of the temperature of gas within a conduit by measuring the rate of propagation of an ultrasonic wave through the gas.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Specific embodiments of this invention will be described in this section to illustrate the principles of the invention. It will be understood that the invention may be embodied in many other ways without departing from such principles. In an effort to structure this description, there follows separate subsections which describe: the principles of operation, physical elements of the system, electronic circuitry, and method of operation.

PRINCIPLE OF OPERATION

Mass flow meter 10 in accordance with this invention measures the velocity and coal loading in a burner feed line by measuring the attenuation and downstream drift of an ultrasonic pulse. Briefly, the theory which permits a measurement of coal loading from these measurements is presented below.

Sound is attenuated according to the exponential relationship:

$$I_{(Z)}/I_0 = e^{-2\alpha_{tot}Z} \quad (1)$$

Where $I_0$ = input signal strength to the media,
$I_{(Z)}$ = signal strength at position Z,
Z = distance into the media along the path of the sound, and
$\alpha_{tot}$ = total attenuation coefficient Analysis of data from mass flow meter 10 is based on the assumption that the attenuation of the sound wave can be described by individual attenuation coefficients due to the various physical phenomena that attenuate the sound. It is further assumed for this description that these coefficients are additive, as set forth by the following relationship:

$$\alpha_{tot}(U_d, C_m) = \alpha + \alpha_t(U_d) + \alpha_s(C_m) \quad (2)$$

Where: $U_d$ is the average gas velocity across the burner line diameter,
$C_m$ is the coal loading,
$\alpha_{tot}$ is the total attenuation coefficient,
$\alpha_g$ is the attenuation coefficient due to quiet gas,
$\alpha_t$ is the attenuation coefficient due to the turbulence, and
$\alpha_s$ is the attenuation coefficient due to the suspended solids.

A number of experiments were conducted for the above-mentioned three flow conditions. Transducer pairs exhibited an attenuation coefficient of 51 db/m for quiet air compared to 36.2 db/m attenuation coefficient predicted by theory. However, these differences were not considered significant since the transducers used were not pure point sources, and they differed in other ways from the ideal case upon which the predicted value is derived.

Figure 1:
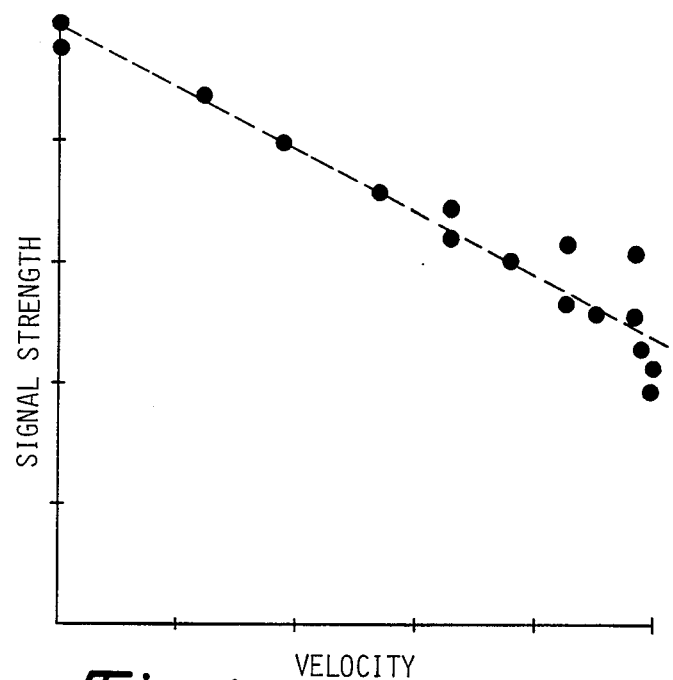
FIG. 1 is a graph of signal strength versus fluid velocity in a representative conduit wherein no solid loading is present.
Figure 2:
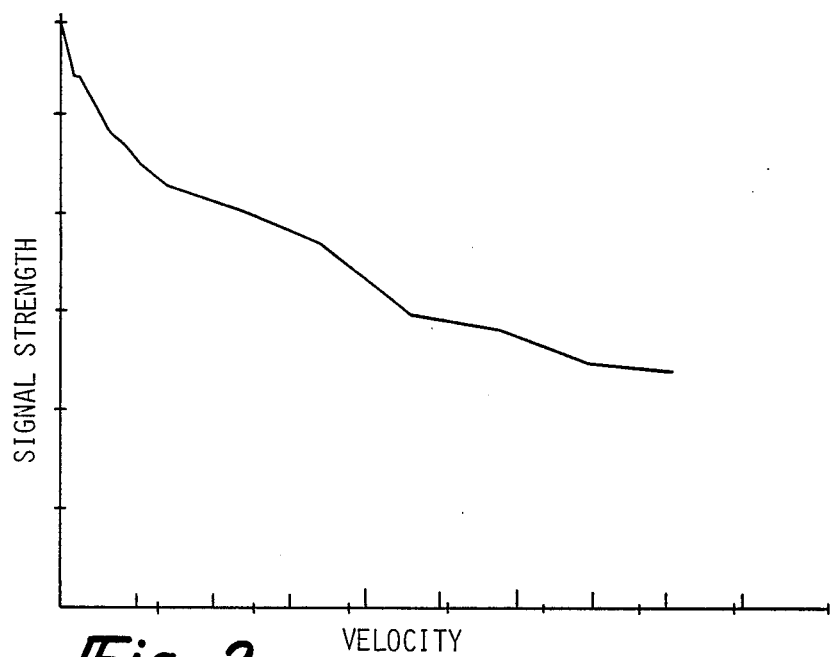
FIG. 2 is a graph of signal strength versus fluid velocity in a conduit wherein solid loading is present.

A representative signal strength versus average gas velocity $U_d$ relationship is shown in FIG. 1. A representative incremental signal strength versus coal loading ($C_m$) is shown by the curve in FIG. 2.

The relationships of the attenuation coefficients explained above can be employed to derive the coal transport rate in a conduit of size Z=D if the average gas velocity ($U_d$) is known. The coefficient $\alpha_g$ is known since it is characteristic of the gas; $\alpha_{tot}$ is also known since it is a directly measured value, and $\alpha_t$ is known once the average velocity ($U_d$) is known. The coefficient $\alpha_g$ is known since it is characteristic of the gas; $\alpha_{tot}$ is also known since it is a directly measured value, and $\alpha_t$ is known once the average gas velocity ($U_d$) is determined, thereby leaving a single variable $\alpha_s$ which may thus be determined. We want to calculate $C_m$ from $\alpha_s$, so we need to determine $\alpha_{tot}$ both with ($\alpha_{tot}(U_d, C_m)$) and without ($\alpha'(U_d, C_m=0)$) coal loading, i.e. $\alpha_s = \alpha_{tot}(U_d, C_m) - \alpha'(U_d, C_m=0)$.

An equation or table of values for $\alpha'(U_d, C_m=0)$ is provided from theory or previous measurements at $C_m=0$. To obtain reliable values of the $\alpha_s$ and therefore $C_m$, it is important to measure reliable values of the signal strength $I_D(Z=D)$ at the receiver and therefore from Eq. 1, to have a reliable and known input signal to the transmitter, $I_o$. A standard reference signal $I_s$ of known intensity is provided and in later discussions considerable circuitry is described for internal calibration of various signals against $I_s$. Computations involving Eq. 1 are actually carried out in terms of logarithmic intensity levels (I.L. in units of decibels, db), i.e. *I.L.* (db) = 10 $\text{Log}_{10}(I/I_s)$. In these logarithmic units (db), the I.L. signals are additive such that an $\alpha$ contribution to the signal above a reference level (I.L.R.) is $\alpha D = I.L.R. - I.L.(D)$ where $\alpha(db/m) = (20/\text{Log}_e 10)\alpha(m^-)$.

The velocity of the gas and the coal gas mixture are determined using the well-known principle of downstream drift of an ultrasonic packet due to fluid flow within a conduit. A sound packet leaving the transmitting transducer would take a time set forth by the following equation to cross the diameter D of the pipe and then reach the receiver.

$$t = D/C_T \qquad (3)$$

Where:
t is time of flight of ultrasonic pulse sound packet,
D is the pipe diameter, and
$C_T$ is the velocity of sound at a particular fluid temperature T. C is really a function of gas density $\rho(T,P)$ but for many applications and this description, we assume the gas pressure (P) to be constant. Otherwise, transducers to measure and correct for pressure would be included.

If there is flow in the pipe with an average velocity $U_d$, as the ultrasound packet crosses the pipe, it will also be blown downstream a distance as set forth below in equation 4.

$$XO = (DU_d)/C_T \qquad (4)$$

Where XO is the downstream distance of displacement of the point at which the received sonic packet is at a maximum
or rearranging terms:

$$U_d = (XOC_T)/D \qquad (5)$$

The investigators have found that $C_T$ and the ultrasound drift do not change appreciably due to the presence of coal particles within the fluid stream. For many applications, the gas temperature T is readily measured with a thermocouple and $C_T$ obtained from a single equation $C_T = C(T)$. Note also that if the time of flight (t) can be measured, then since D is known, C(T) can be obtained from equation (3) and T from $C_T = C(T)$. Thus, the gas temperature can be measured either by using conventional thermocouples or by measuring the time of flight (t).

Figure 3:
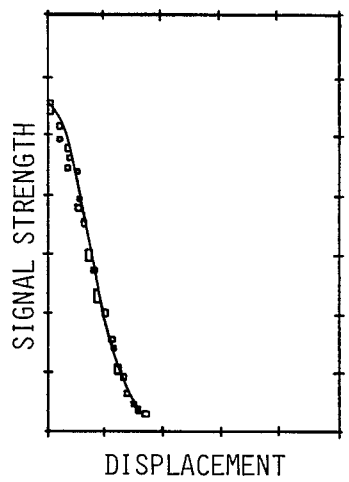
FIG. 3 is a graph of signal strength versus displacement of a receiving transducer with no fluid flow in a representative conduit.
Figure 4:
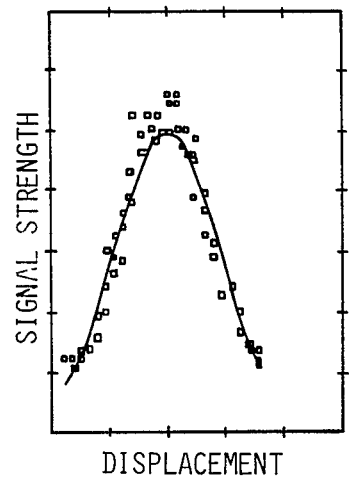
FIG. 4 is a graph of signal strength versus displacement of a receiving transducer with fluid flow but without solid loading in a representative conduit.
Figure 5:
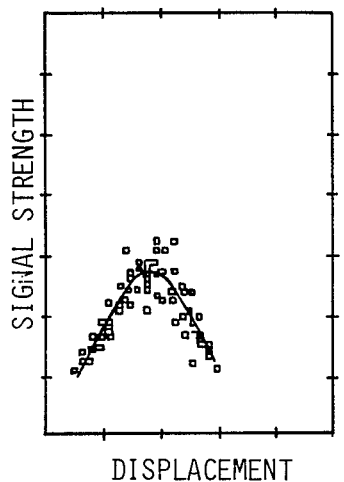
FIG. 5 is a graph of signal strength versus displacement of a receiving transducer with fluid flow and solids loadings in a representative conduit.

In accordance with the present invention, a receiving transducer is moved to various locations (X) along the longitudinal axis of the pipe to determine the point of downstream displacement at which the receiving signal is at its maximum, thereby indicating the downstream drift of the ultrasonic packet. FIGS. 3, 4 and 5 are representative graphs showing the received signal strength of an ultrasonic packet as the receiving transducer is moved to various (X) positions. FIG. 3 is a graph showing the received signal strength of an ultrasonic packet versus displacement (X) of the receiving transducer with no flow through the conduit. As expected, this curve is approximately one-half of a general Gaussian (normal) distribution where the maximum (termed $Y_{max}$) occurs at zero displacement (XO=0) which indicates no downstream drift. The existence of a distribution at zero gas flow is attributable to the sound divergence because of a geometrical factor due to the finite size of the transducers (Fraunhofer region). FIG. 4 is a curve similar to FIG. 3 except that fluid flow through the conduit is present which causes downstream drifting of the ultrasonic packet. With fluid flow, the turbulent eddies scatter the sound and the intensity of the $Y_{max}$ is therefore decreased from that of FIG. 3. FIG. 5 is another distribution showing the significant reduction in magnitude of the received signal with the presence of coal suspended in the moving fluid. Added solids in suspension increase the sound absorption and scattering and further decrease the level of $Y_{max}$.

The mass flow meter according to this invention is designed to measure the primary sound beam and not the scattered sound. This is accomplished by pulsing the transmitted sound beam and thus measuring the peak of the first received sound signal.

While the above relationships would appear to enable a mass flow meter to be designed without significant challenges, an enormous amount of data must be recorded, processed and outputted. During development of the WSU thesis, data were hand recorded and processed in an extremely inefficient manner. In accordance with this invention, a compact and simple-to-use on-line instrument is provided which makes use of the above theory.

PHYSICAL ELEMENTS OF THE MASS FLOW METER

Figure 6:
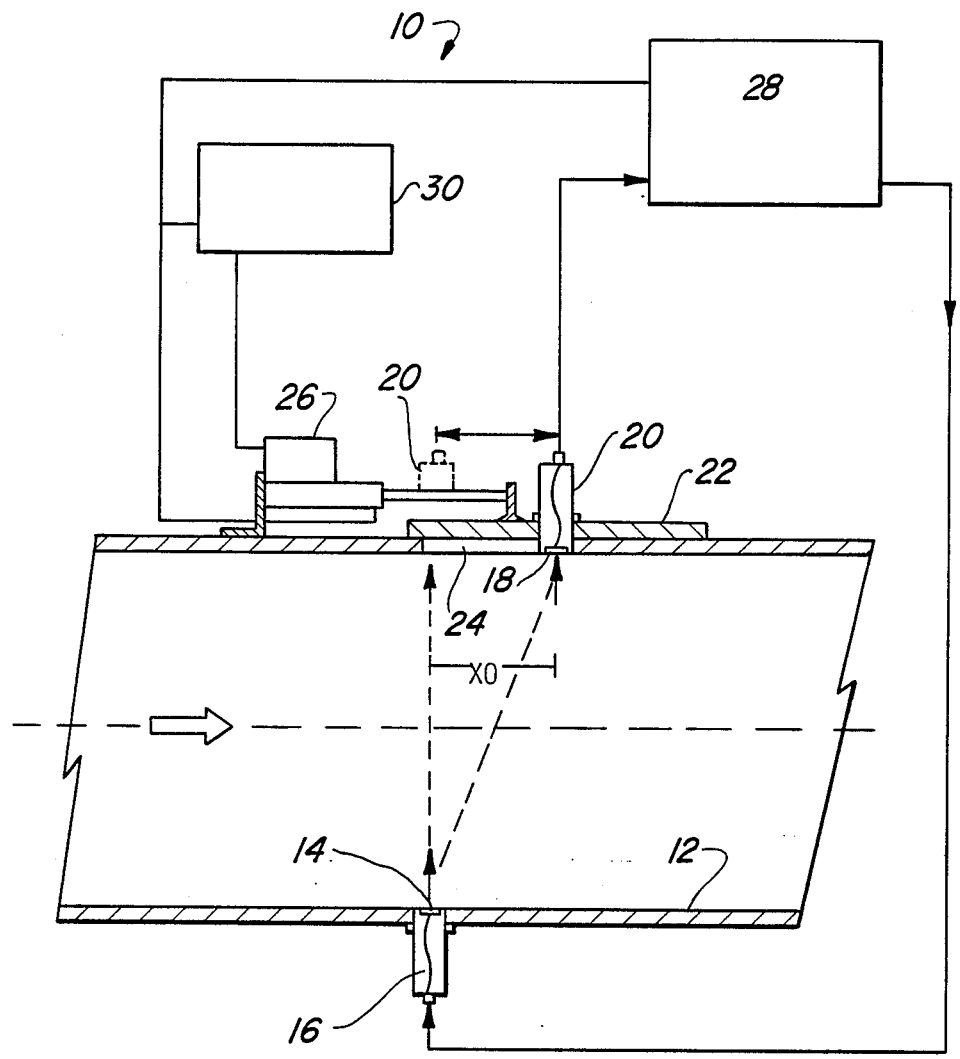
FIG. 6 is a pictorial view of the physical elements of a mass flow meter in accordance with the invention.

FIG. 6 illustrates a mass flow meter 10 in accordance with this invention. Conduit 12 is shown for conducting a stream of finely divided coal dust entrained within a gas such as air. Transmitting transducer 14 penetrates the wall of conduit 12 but is firmly mounted to the conduit and is a commercially available device approximately one-inch diameter and about 3/16 inch thick and produces an ultrasonic signal at 460 kHz. Transducer holder 16 penetrates the wall of conduit 12 and holds the transducer face flush with the inside wall of the conduit. The transducer operates in a piston mode, i.e. the sound packets are aimed directly across conduit 12. Receiving transducer 18 (which may be the same as the transmitting transducer 14) is shown in sliding mount 20 which is fixed to sliding plate 22 such that the receiving transducer can be moved along the longitudinal axis of conduit 12 within slot 24. Sliding plate 22 is provided to prevent leakage of fluid. Receiving transducer 18 is moved longitudinally by stepper motor drive 26 to various points X, which can accurately position receiving transducer 18 at the desired location within a given range. The position of receiving transducer 18 within the sliding mount 20 is illustrated in phantom lines in FIG. 6 at the position of X=0 which is directly opposite transmitting transducer 14. Receiving transducer 18 is shown in full lines at an exemplary position at which the received signal strength is at a maximum (XO). Electronics package 28, which will be described below in detail, provides electrical voltage signals for transmitting transducer 14, processes information from receiving transducer 18, and controls movement of receiving transducer 18 by commands sent to stepper motor drive circuit 30. As an alteration of mass flow meter 10 within the scope of this invention, transmitting transducer 14 could be driven at various longitudinal positions while receiving transducer 18 would be fixed to conduit 12.

ELECTRONIC CIRCUITRY

Figure 7:
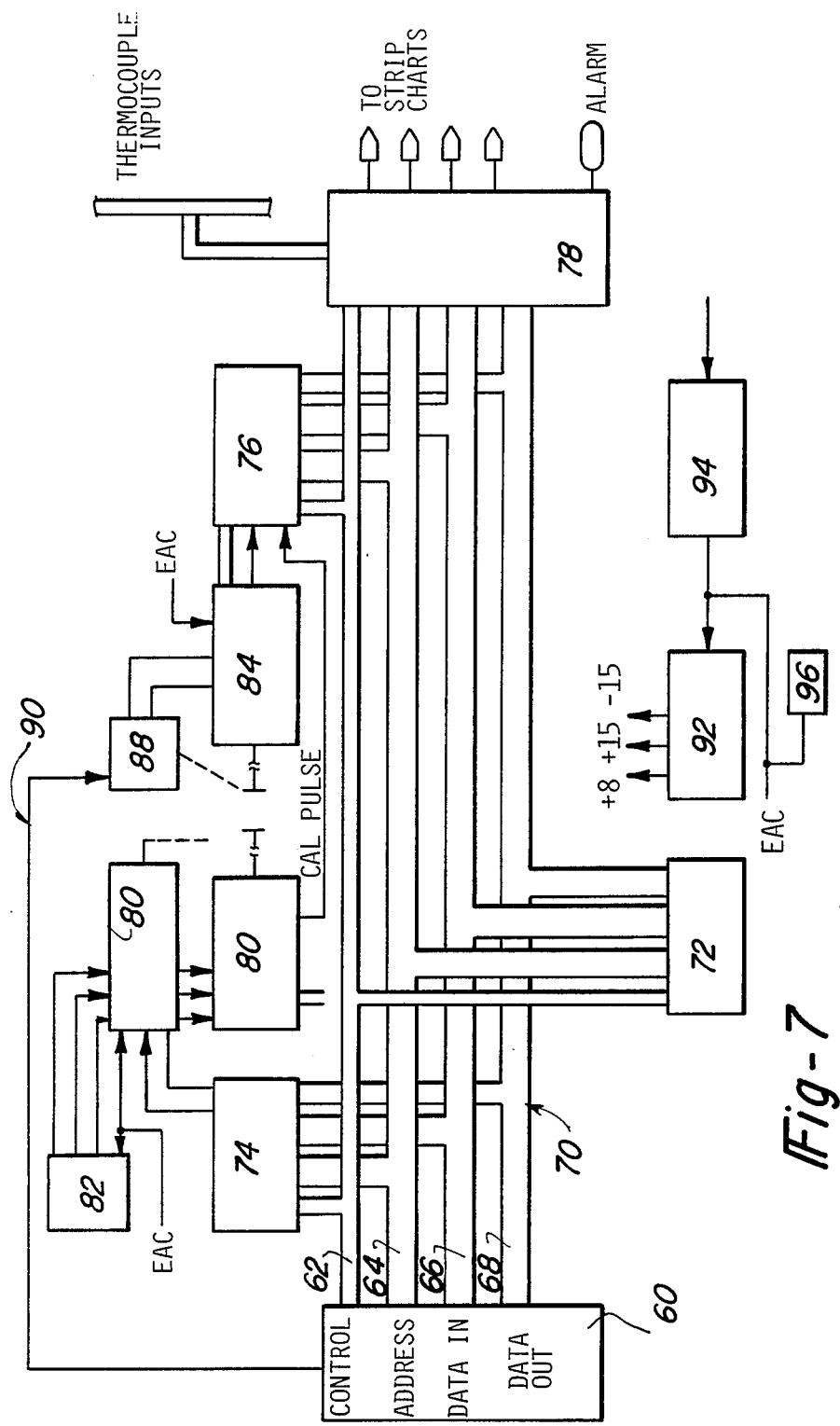
FIG. 7 is a schematic block diagram giving an overview of the computer system of the invention.

The mass flow meter of the present invention is preferably implemented in conjunction with a digital computer such as a microcomputer. Referring to FIG. 7, a single board S100 bus microcomputer 60 is illustrated for purposes of explaining the invention. while the S100 bus computer system architecture is presently preferred, other types of computers and computer system architectures may also be used in practicing the invention. Microcomputer 60 provides control bus 62, address bus 64, data-in bus 66 and data-out bus 68. These four buses are referred to herein collectively as computer bus 70.

Coupled to computer bus 70 are a plurality of electronic circuits which provide the interface between ultrasonic transducers 14 and 18 and microcomputer 60. Generally speaking, microcomputer 60 controls the positioning of transducers, transmitting, receiving and analyzing of signals, and providing analyzed data in a convenient form for human or automated evaluation. The program or set of instructions for causing microcomputer 60 to perform these functions is contained in non-volatile memory 72. Preferably, memory 72 is a bubble memory device providing at least 128K bytes of storage. Non-volatile memory 72 is coupled to computer bus 70, as illustrated.

Also coupled by computer bus 70 is timing circuit 74, gated peak analyzer circuit 76 and auxiliary input/output circuit 78. Timing circuit 74 is illustrated in greater detail in FIG. 8; gated peak analyzer circuit 76 is illustrated in greater in FIG. 12; and, auxiliary input/output circuit 78 is illustrated in greater detail in FIG. 9. Each of these circuits is more fully discussed below.

With continued reference to FIG. 7, the electronic circuit further comprises power amplifier circuit 80, with associated high voltage power supply 82, for providing high power pulses to be delivered to transmitting transducer 14. Also provided is crystal amplifier circuit 84 coupled to receiving transducer 18 for amplifying the received signals before they are fed to grated peak analyzer circuit 76. If desired, more than one pair of transducers may be iplemented by multiplexing techniques. Amplifiers 80 and 84 are illustrated in greater detail in FIG. 11, which will be discussed more fully below.

As explained above, the invention performs mass flow measurements by positioning transmitting transducer 14 or receiving transducer 18 at a succession of positions along the fuel delivery conduit 12, at each position taking data of ultrasonic signal strength. In order to properly position the transducer at the successive positions, transducer position controller 88 is provided. Controller 88 is responsive to microcomputer 60 via a serial line, such as an RS232 interface provided by microcomputer 60. In FIG. 7, the RS232 interface is illustrated generally at 90. Position controller 88 is illustrated in greater detail in FIG. 10, discussed below.

According to common practice, the microcomputer bus 70 has associated with it a power supply 92 which provides the necessary voltages for operating the microcomputer circuits as well as the electronic circuits of the invention. All electronic circuits can be expected to generate a certain amount of heat through resistive dissipation. In addition, the invention must be adapted for use in furnace rooms and boiler rooms, which often are at elevated ambient temperatures. In order to insure that the circuits will perform in a stable and accurate manner, environmental control circuit 94 is provided. Control circuit 94 provides a thermal sensor and circuit for shutdown of power supply 92 when over temperatures occur. In some applications, environment control circuit 94 may also provide control signals to heat removal device 96. The heat removal device may comprise forced air blowers, refrigeration equipment, or other means for conducting heat away from the circuits of the invention.

Figure 8:
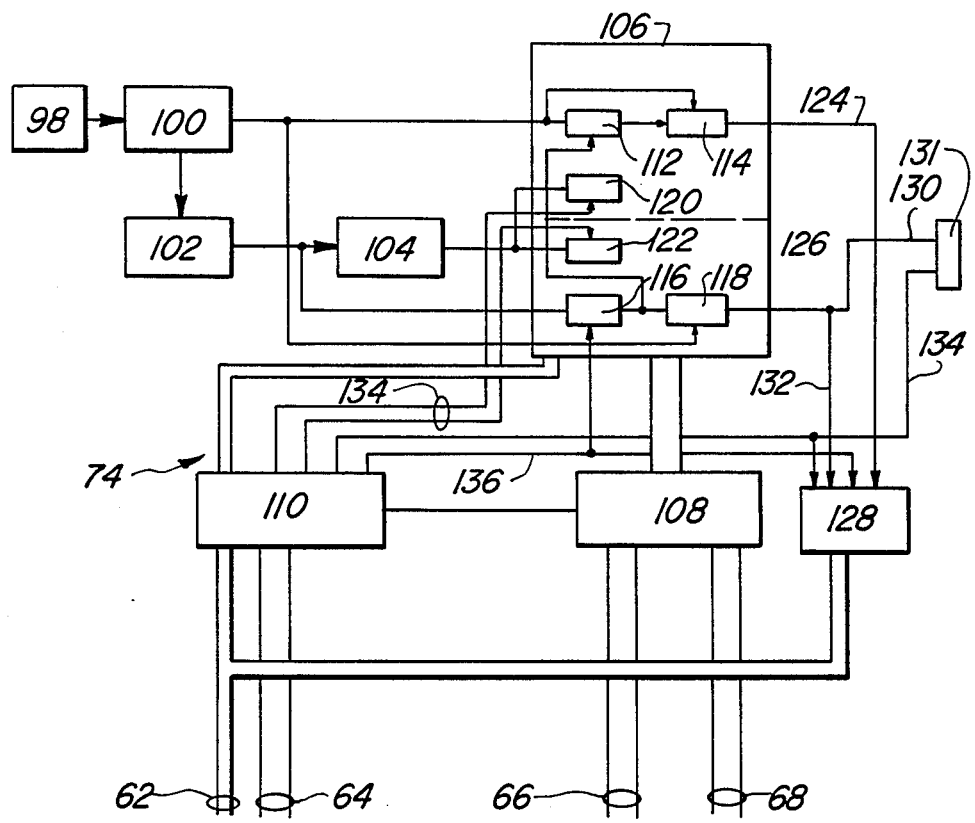
FIG. 8 is a schematic block diagram of the timing circuit of the invention.

Referring next to FIG. 8, the timing circuit will be discussed in greater detail. Timing circuit 74 produces the clock pulses and timing pulses used in generating the transmitted ultrasonic signals and receiving the incoming signals. A stable clock frequency is provided by 16 MHz crystal oscillator 98. The output of crystal oscillator 98 is fed through divide by 2 and divide by 16 circuit 100, to provide a 1 MHz high-frequency reference clock. The 8 MHz output of circuit 100 is fed to a divide by 625 circuit 102 which provides a low-frequency clock at 12.8 kHz. The 12.8 kHz signal is in turn fed through a divide by 128 circuit 104 to provide a 100 Hz reference signal for possible real time operations.

At the heart of timing circuit 74 is programmable counter circuit 106. The programmable counter circuit is preferably implemented using a pair of very large scale integrated circuit (VSI) multiple 16 bit programmable counters, such as Intel 8253 programmable interval timer integrated circuits. The programmable counter circuit 106 contains a plurality of individually programmable counters which may be programmed to operate in different modes. The internal counters of programmable counter circuit 106 are programmed under software control through bus transceiver 108. Bus receiver 108 is coupled to data-in bus 66 and data-out bus 68 of computer bus 70. Programmable counter 106 is also responsive to control bus 62 and address bus 64 of computer bus 70 via address decode and control circuit 110. During power up initialization, programmable counter circuit 106 is initialized so that internal timer 112. operates as a hardware triggere strobe. Internal timer 114 is programmed to operate as a programmable one-shot. Internal timer 116 is programmed to operate as a rate generator or divide by N counter. Internal timer 118 is programmed to operate as a programmable one-shot. If desired, internal timers 120 and 122 may be programmed to operate as software timers for producing auxiliary timing signals via bus transceiver 108 and address decode and control circuit 110. As many microcomputers provide software timing functions at the operating system level, these auxiliary software timers may not be required in all applications. The programming of internal timers 112 through 122 is performed by writing control words and data to programmable counter circuit 106 via bus transceiver 108 and address decode and control circuit 110. For additional information concerning programming, reference may be had to the 8253/8253-5 programmable interval timer literature of Intel Corporation.

The programmable counter 106 provides a first output 126 and a second output 124, the first output being the output of internal timer 114 and the second output being the output of internal timer 118. Output 124 provides a delay gate signal, while first output 126 provides the pulse width signal. The delay gate signal is placed on control bus 62 through control bus controller 128. The pulse width signal is supplied to the power amplifier 80 via two alternate routes. The pulse width signal is supplied to an external power amplifier 80 via pulse width line 130, which couples to an external power amplifier jack 131. The pulse width signal is also supplied through pulse width line 132 which is in turn coupled to control bus controller 128. Bus controller 128 in turn places the pulse width signal on bus 62 where it is made available to an internal power amplifier 80' (not shown). Internal power amplifier 80' is assembled on a plug-in circuit board adapted to be coupled directly to the computer bus 70. When internal power amplifier 80' is used, the pulse width signal would normally be supplied to amplifier 80' via pulse width line 132 and control bus 62. In other applications, it may be desirable to use external power amplifier 80 which can be placed remote from the computer bus. In such applications as shown, the pulse width signal is supplied to power amplifier 80 through pulse width line 130 and jack 131.

Also provided on jack 131 is a calibrate/data line 134. A calibrate/data signal is generated by address decode and control circuit 110 and placed on line 134. The calibrate/data signal is also coupled to the calibrate/data line (CA/DA) of computer bus 70 via bus controller 128. The CA/DA line is preferably one of the normally unused control lines of computer bus 70 and carries a logic signal which toggles amplifier 80 between a data mode and a calibrate mode. These modes will be discussed more fully in connection with FIG. 11, described below.

Address decode and control circuit 110 also provides a pair of start/stop lines 134, which carry logic signals for turning software timers 120 and 122 on and off. In addition, the address decode and control circuit provides a go/stop line 136, which is coupled to internal timer 116 and also to control bus controller 128. The go/stop line 136 carries the logic signal which enables and disables internal timer 116. When internal timer 116 is disabled, the pulse width signal at output 126 is suppressed, and hence, no ultrasonic signals are transmitted.

Figure 9:
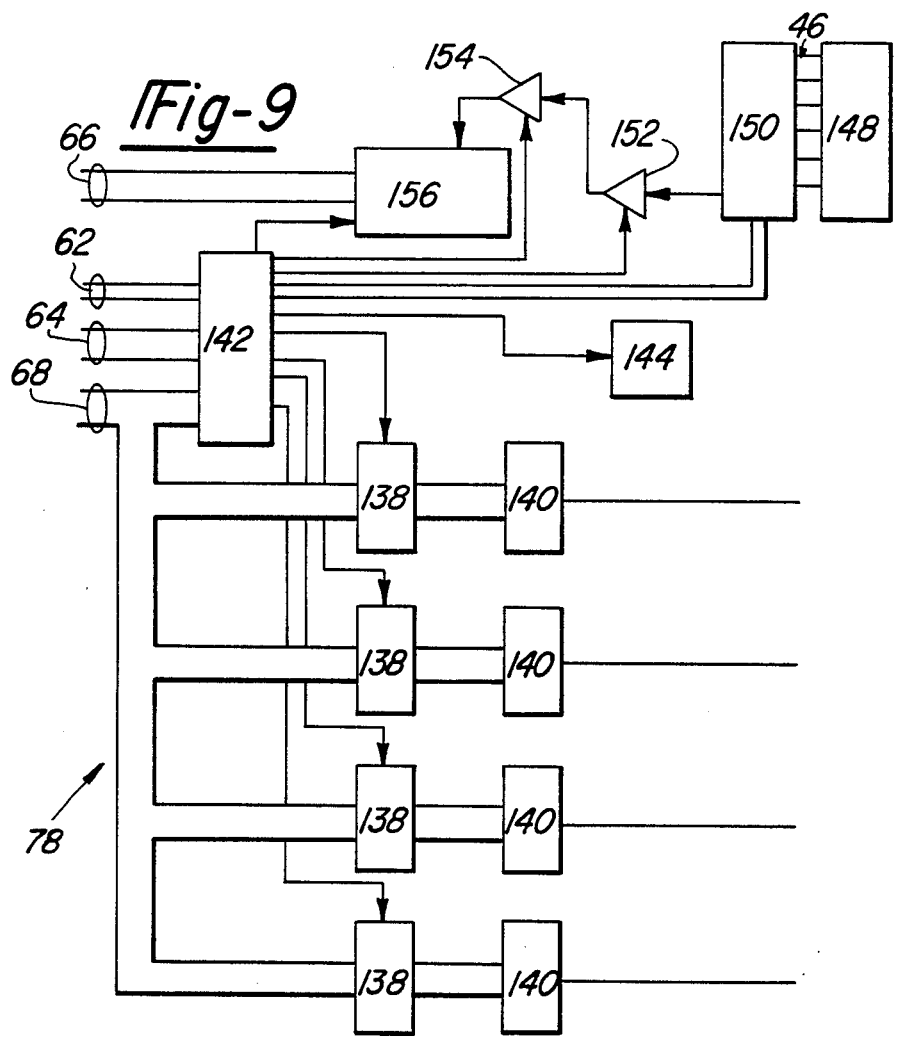
FIG. 9 is a schematic block diagram of the auxiliary input/output circuitry of the invention.

Referring now to FIG. 9, auxiliary input/output circuit 78 comprises a plurality of storage registers 138 and D-to-A converters 140 coupled to data-out bus 68. The D-to-A converters 140 provide analog voltages, typically over a 0–10 volt range for driving strip chart recorders, or other analog signal display devices. Each D-to-A converter and register comprises a data output channel. The channels are individually selected for output under control of address decoder and timer circuit 142. The address decoder and timer circuit is coupled to control bus 62 and address bus 64 in the usual fashion. Also coupled to circuit 142 is alarm device 144 which may be energized under computer control in instances where the operator's attention is required. Circuit 78 further comprises a plurality of analog inputs 146, which may be coupled to temperature sensing thermocouple devices 148 used to determine the temperature (or to transducers for pressure) at strategic points within the fuel delivery conduit. These measurements may, in turn, be used in analyzing the mass flow data and for correcting temperature (or pressure) dependent effects. For example, as previously described, the speed of transmission of an ultrasonic pulse $C_T$ across conduit 12 is a function of fluid temperature. As an alternative to measuring temperature by a thermocouple, temperature may be determined if the time of flight of the ultrasonic signal within the gas is known. Such time of flight measurement may be accomplished by using a counter which is incremented by a timing signal, for example, the 16 MHz clock signal between the pulse width signal until an output is sensed from amplifier 84. Such time of flight measurements would be made when the gas is at a known temperature to provide a baseline measurement which would be compared against later measurement to determine gas temperatures. Analog inputs 146 are coupled to multiplexer circuit 150, which selectively interrogates each analog input individually and provides a single output through programmable gain instrument amplifier 152 and sample and hold circuit 154 to an A-to-D converter 156. The A-to-D converter 156 is, in turn, coupled to the data-in bus 66. Multiplexer 150 selectively interrogates the analog inputs in accordance with instructions received from control circuit 142, and the gain of amplifier 152 is also controlled by circuit 142.

Figure 10:
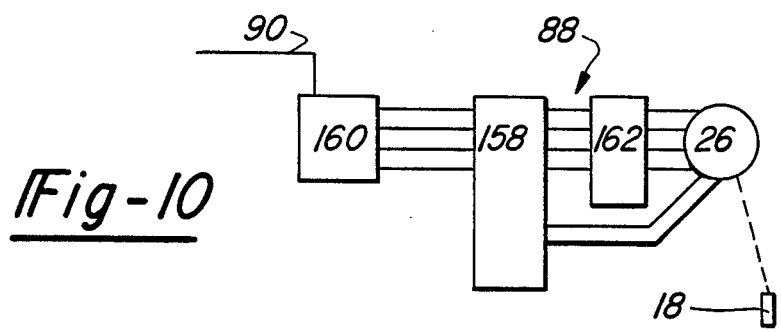
FIG. 10 is a schematic block diagram of the transducer positioning circuitry of the invention.

With reference to FIG. 10, transducer position controller 88 is illustrated. Controller 88 comprises microcontroller 158, such as Intel integrated circuit 8748. Microcontroller 158 is coupled to the RS232 line 90 via RS232 interface 160. Microcontroller 158 drives field effect transistor (FET) driver 162, which in turn energizes stepper motor 26. Stepper motor 26 is provided with limit switches which send signals to microcontroller 158 to inform microcontroller 158 when the stepper motor physical limits have been reached. Receiving transducer 18, preferably a piezoelectric transducer, is physically coupled to stepper motor 26 as described above.

Figure 11:
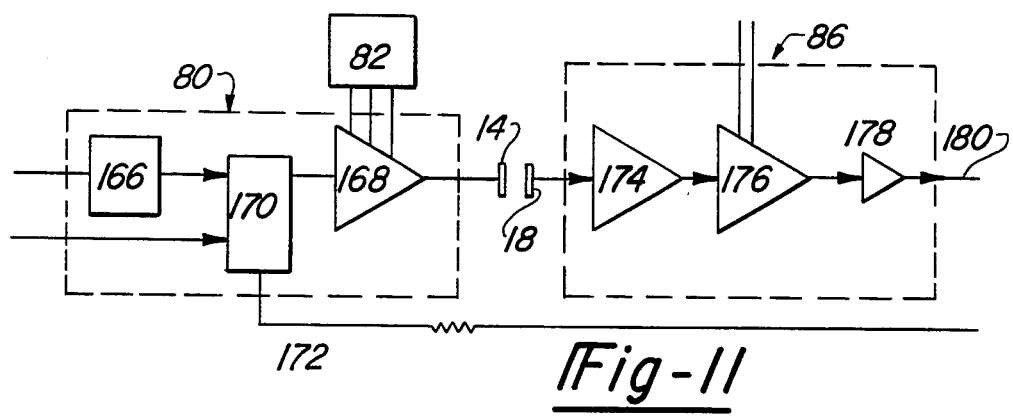
FIG. 11 is a schematic block diagram of the transducer driver circuitry of the invention.

Power amplifier circuit 80 and crystal amplifier 84 are illustrated in FIG. 11. Power amplifier 80 supplies ultrasonic oscillations to transmitting transducer 14, while crystal amplifier 84 amplifies signals received by receiving transducer 18. Power amplifier 80 comprises a pulsed oscillator 166 which produces oscillations at ultrasonic frequencies, preferably at 460 kHz. Pulsed oscillator 166 is responsive to the pulse width signal (PW) which is provided either via pulse width line 130 and jack 131 or via line 132 and control bus 62. Preferably, oscillator 166 is configured to produce oscillations which are gated on and off at the pulse repetition frequency (PRF) to produce packets of ultrasonic energy. The pulse repetition frequency is appreciably lower than the 460 kHz ultrasonic frequency and is preferably about 60 Hz. Preferably, the oscillations are gated or produced such that the initial oscillation begins at the zero crossing to prevent spurious harmonica and noise from being produced.

The output of pulsed oscillator 166 is supplied to power amplifier 168 via selector circuit 170. Selector circuit 170 is programmable via the CA/DA (calibrate/data) line of bus 62. In the data mode, the known power signal level $I_s$ is generated by pulsed oscilator 166 and is steered through selector circuit 170 to power amplifier 168. In the calibrate mode, the energy from oscillator 166 is steered through calibrate line 172 to the gated peak analyzer circuit 76 described below. Power amplifier 168 receives high voltage from high voltage power supply 82. The output of amplifier 168 drives transducer 14 into oscillation at ultrasonic frequencies. Preferably, transducer 14 is tuned at a relatively high Q to oscillate at a predetermined ultrasonic frequency. The frequency of pulsed oscillator 166 is selected to produce strong resonant oscillations in transducer 14.

Receiving transducer 18 is a similarly tuned, high-Q resonant crystal which will vibrate or ring in the presence of received ultrasonic signals to produce a signal voltage. This signal voltage is amplified in the preamplifier 174, and further, amplified in programmable gain amplifier 176. Preferably, preamplifier 174 provides 50 db of gain while programmable amplifier 176 provides gain in 10 db steps or increments according to control signals sent from gated peak analyzer circuit 76 to crystal amplifier 84, or sent from microcontroller 158 of position controller 88 (FIG. 10) in applications where amplifier 84 is located remote from the gated peak analyzer circuit. If desired, buffer amplifier 178 may also be included as a means of interfacing the programmable gain amplifier with the gated peak analyzer circuit 76. Circuit 76 is coupled to circuit 84 via lead 180.

Figure 12:
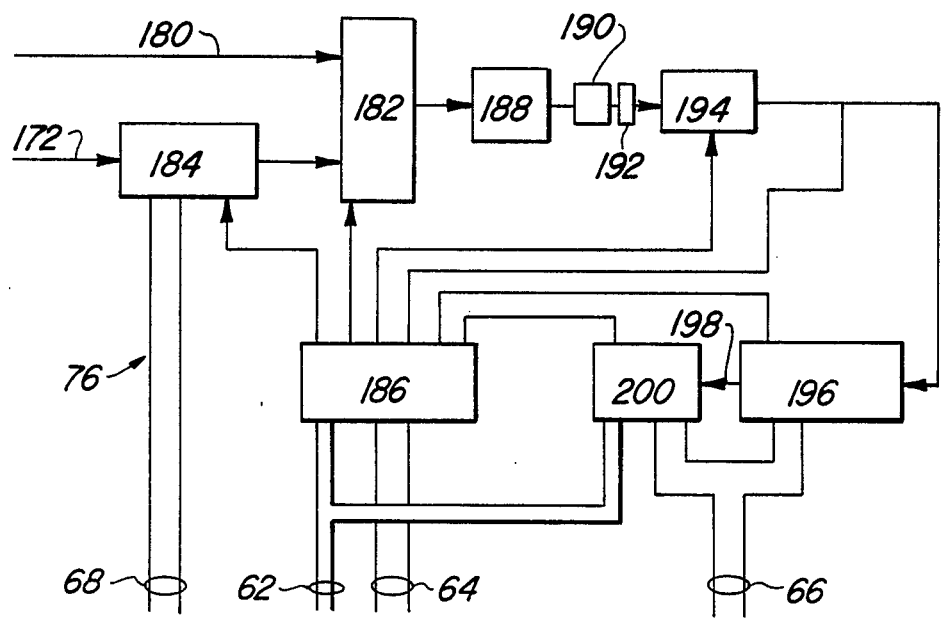
FIG. 12 is a schematic block diagram of the gated peak analyzer circuitry of the invention.

Turning now to FIG. 12, the gated peak analyzer circuit 76 comprises multiplexer 182 which receives signal inputs from lead 180 and also from a twelve bit digitally controlled attenuator 184. Attenuator 184 is receptive of calibration signals on calibration line 172 and has a variable attenuation determined by data placed on data-out bus 68. Address decoder and timer circuit 186 is provided to address the attenuator 184 when setting the attenuation level. Circuit 186 also controls multiplexer 182 to select between the received signal on lead 180 or the calibration signal from attenuator 184, depending on whether data or calibration steps are being performed.

The output of multiplexer 182 is coupled to a fast diode circuit 188. In practice, the received signal on lead 180 comprises bipolar oscillations. Fast diode circuit 188 strips the negative going portion of the received signal and boosts or shifts the stripped signal so that the unipolar peak amplitude remains at the same level as the peak-to-peak amplitude of the unstripped received signal. Following the fast diode circuit 188 is analog switch 190 which is gated on and off by the pulse width/delay gate signals on control bus 62. Analog switch 190 is gated on and off to provide a receive window which is open at times when the received signal or calibration signal is expected and closed at other times to eliminate spurious signals and noise. Following analog switch is filter 192, preferably an eighth order Butterworth filter with staggered poles to produce a steep slope. The output of filter 192 is essentially an envelope waveform of the gated signal. This envelope signal is applied to resettable gated positive peak detector 194 which provides an output voltage level equal to the maximum signal excursion of the input envelope waveform. The output of gated peak detector 194 thus represents the peak-to-peak value of the bipolar envelope received. This value is fed to A-to-D converter 196, which converts the value into a digital signal for output on data-in bus 66. In general, gated peak detector 194 maintains the maximum peak value until being reset by the end of conversion (EOC) signal of A-to-D converter. The rate at which A-to-D converter 196 converts the peak signal into a digital signal is dependent upon the internal operation of the A-to-D converter circuit. When the conversion has been completed, A-to-D converter circuit 196 provides an end of conversion signal (EOC) on end of conversion line 198 to interrupt control circuit 200. Interrupt control circuit 200 generates the interrupt to microcomputer 60 and is also responsive to the go/stop signal which enables and disables the interrupt control circuit. When enabled, the interrupt control circuit allows an interrupt on control bus 62 when the end of conversion signal is received. Microcomputer 60 responds to the interrupt by addressing A-to-D convertor 196 and reading the peak value on data-in bus 66. When the circuit is in the stop mode, interrupt control circuit 200 is disabled and any end of conversion signals will be ignored.

Figure 13:
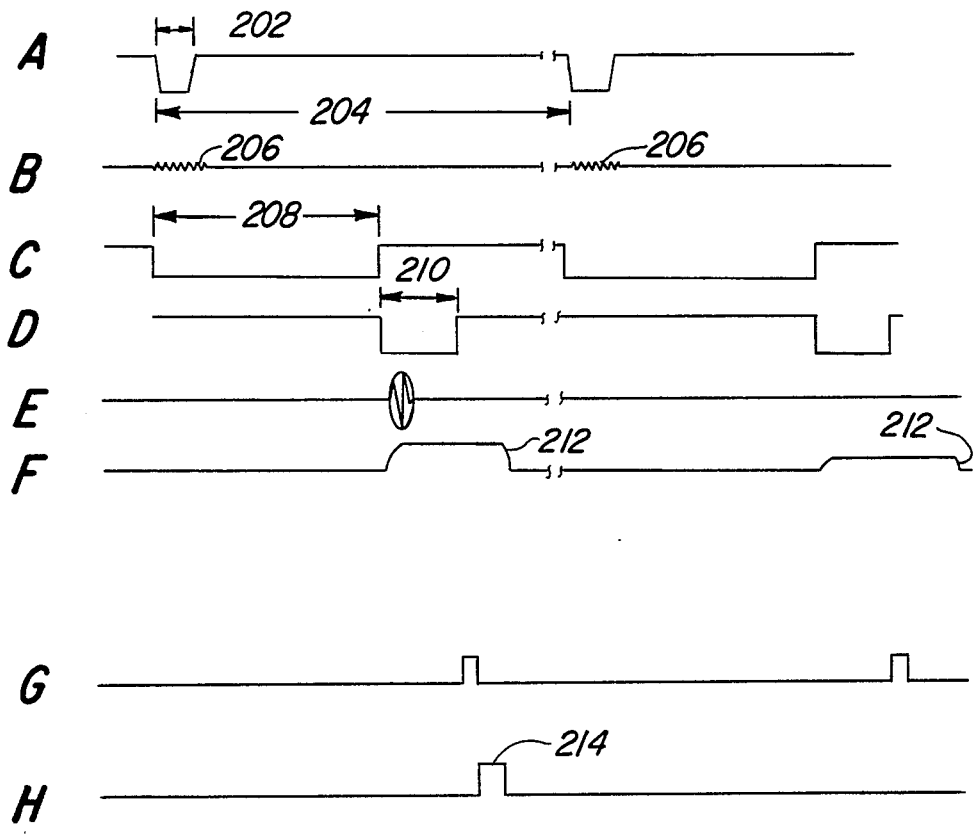
FIG. 13 is a waveform timing diagram useful in understanding the circuits of the invention in operation.

For a better understanding of the circuit in operation, reference may now be had to FIG. 13. FIG. 13 depicts a series of waveforms which illustrate exemplary signals produced by the invention during operation. Line A of FIG. 13 depicts the pulse width signal produced by internal timer 118 of programmable counter 106. The pulse width 202 determines the length of time during which each packet of ultrasonic oscillations is produced. Repetition interval 204 determines the pulse repetition frequency (PRF) or rate at which the ultrasonic packets are transmitted. Line B illustrates the transmitted waveform as a series of packets 206 of ultrasonic energy. Each packet comprises oscillations at the ultrasonic oscillator frequency, preferably 460 kHz. Line B thus represents the output waveform of pulsed oscillator 166.

Line C is the delay signal used in generating the delay gate signal on Line D. The delay signal is essentially a square wave signal which changes state in a first direction in synchronism with the leading edge of the pulse width signal on Line A. The delay signal changes to a second state after a predetermined delay 208. The length of delay 208 is determined by internal timer circuits 112 and 114 of programmable counter 106. The delay time may be changed during operation of the invention under software control through the data-out bus 68. The pulse width signal on Line A and the delay signal on Line D are in synchronism because both are derived from 16 MHz oscillator 98. Line D depicts the delay gate signal, which occurs in synchronism with the trailing edge of the delay signal on Line C. The delay gate time 210 is controlled by internal timer 114 and defines a receive window at a predetermined time interval (interval 208) after the transmitted pulse is sent. The receiver circuitry is active only during this window, so that spurious signals and noise occuring at other times do not affect the accuracy of the mass flow measurements.

Line E depicts an exemplary received signal waveform. The received signal may be considerably distorted due to turbulent eddy and particle scattering and absorption of the sound. To insure robust data despite these signal level fluctuations, the invention normally takes many data samples at each physical location within the conduit. An averaging or other statistical process is performed numerically on the received data samples to determine a statistically significant data point at each physical location.

Line F depicts the output of the gated peak detector 194. Note that the leading edge of the waveform of line F is curved, following the contour of the leading edge of the envelope of the received waveform of Line E. Once the peak of the envelope is reached, the output of gated peak detector 194 remains at a constant peak level until being reset as at 212.

Line G depicts the start of conversion signal used to activate A-to-D converter 196. The start of conversion signal is timed to occur after the delay gate signal has ended, i.e. after the receive window is closed. In this fashion, the A-to-D converter is certain to receive valid data and is unaffected by spurious signals and noise occuring outside of the window. The end of conversion signal on Line H, indicated by the trailing edge of pulse 214, signals interrupt control circuit 200 when A-to-D converter 196 has completed its conversion. Using presently available commercial A-to-D convertors, the conversion time may be on the order of ten microseconds. The conversion time is not critical, provided the repetition interval 204 is long enough so that data from a first cycle has been analyzed and input to microcomputer 60 before the second cycle begins.

Data are taken at each of the successive transducer locations (X) in the fashion described above. Preferably, a plurality of separate ultrasonic packets of energy are transmitted and received for each physical transducer location, and the analyzed data values are statistically processed, as by averaging, for example, to develop one data value for each physical location. The data values and physical locations may be stored in an array in the memory of microcomputer 60 where further analysis is performed based on the data in the entire array.

In general, the data values stored in the array represent ultrasonic power levels or signal strengths at various positions of receiving transducer 18. When a sufficient number of samples are taken at each physical location, the data values give a statistically significant indication of the signal strength at that particular (X) position. Depending upon the flow rate, the signal strength values will typically fall along a Gaussian (normal) distribution versus the position of transducer 18 having a peak at a location determined by the fluid velocity. In applications where a Gaussian distribution is observed, it is only necessary to take sufficient data points to establish the position and magnitude of the peak of the distribution. For the fluctuating signal in turbulent flow, the accuracy is greatly improved if the data set actually includes the peak.

The range of travel can be fixed or, for a slowly varying gas velocity, this condition is readily implemented since range of stepper motor 26 for position (X) can be adjusted using the peak caluculated from the previous data set. The direction of motion of the receiving transducer is also stored in case it is needed in the subsequent analysis of the data.

METHOD OF OPERATION

Transmitting transducer 14 is driven by amplifier 80 to produce sonic wave packets at a frequency of 460 kHz and is gated on for a period of about 20 microseconds thereby producing about nine individual sound waves. The 20 microsecond on period is repeated at a pulse repetition frequency (PRF) of 60 Hz.

The computer program stored in memory 72 which controls microcomputer 60 automatically moves receiving transducer 18 through a preset number of steps (about 30) through a preset range of X (about 0.5 inch in a representative system) pausing after each step long enough to measure and store the received signal strenth (Y) a desired number of times (preferably about 50) from which it then computes and stores an average value $Y_n$. At the end of the sweep through the range of X, the computer program calculates from the stored values $(X_n, Y_n)$ values for XO and $Y_{max}$ and then, using these values and a measurement of the temperature T and other stored information, it calculates and displays (and/or records) values for the fluid velocity ($U_d$), the solids loading ($C_m$) and the solids mass flow rate $MFR = U_d \pi D^2 \rho g (1 + C_m)/4$ where $\rho g$ is the density of the gas). The program then reverses the direction of travel of receiving transducer 18 and repeats these steps while moving in the opposite direction. Values of $U_d$, $C_m$ and MFR are updated about every 30 seconds, but could be updated at a much faster rate if desired.

The values described above are determined and calculated by completing the mutual tasks set forth below:

(1) Generate a pulsed AC voltage signal of ultrasound frequency;

(2) Drive transmitting transducer 14 by amplifier 80 to generate a packet of ultrasound and aim it across conduit 12 containing the flowing medium to be characterized;

(3) Move receiving transducer 18 by position controller 86 on the opposite side of conduit 12 in the range of reception of the ultrasound beam to the ($X_n$) position.

(4) Using gated peak analyzer 76, determine the maximum level of power received by receiving transducer 18 from each packet of sonic energy produced by transmitting transducer 16.

(5) Convert the ultrasound maximum level of power received by receiving transducer 18 to an AC voltage signal;

(6) Measure the received signal strength Y(m) produced by amplifier 84 and convert the value to a digital form and store it in the memory of microcomputer 60. Repeat this step M-times at a particular X(n) location, calculate the average value of the Y(m) and store it in microcomputer 60 memory as the n-th average value, Y(n);

(7) Repeat steps (3) through (6) n-times at various positions X(n) storing the X position and signal strength pairs (X(n), Y(n)) in memory;

(8) Perform numerical finite difference calculations on the X(n), Y(n) values to determine XO, and $Y_{max}$ where XO represents the position in the receiving transducer range where the signal strength is maximum, $Y_{max}$;

(9) From the value X0 and existing theory, compute the value of

(10) From the value of $Y_{max}$ and the known calibration of amplifier 84, compute the total attenuation coefficient $\alpha_{tot}(U_d, C_m)$ in db/m of the ultrasound with the suspended particles and from the difference over that with zero particle loading (known from calibration), calculate the attenuation coefficient due to just the suspended particles $\alpha_s = \alpha_{tot}(U_d) - \alpha'(U_d, C_m=0)$ (where $\alpha'(U_d, C_m=0)) = \alpha_g + \alpha_t$).

(11) From the value $_s$ and existing theory, compute the solids loading of the gas, $C_m$, and display it and the gas velocity, $U_d$ and MFR for the operator;

(12) Return to step 1 to start the cycle over again and continue to update the $C_m$, $U_d$ and MFR readings once in about every 30 seconds.

Using the above-described theory, physical elements, electronics and method of operation, a mass flow meter 10 which enables continuous measurement of the mass transport rate of coal in a feed line is provided. The measured values of coal transport rate may be used to provide a readout for an operator, or may be further directly coupled to a control system for control of valves or other devices which modulate coal loading. In either case, mass flow meter 10 enables the operators of coal fired plants to increase the efficiency of operation by enabling close control over boiler coal feed rates to the individual burner feed lines.

While the above description constitutes the preferred embodiments of the present invention, it will be appreciated that the invention is susceptible to modification, variation and change without departing from the proper scope and fair meaning of the accompanying claims.

What is claimed is:

1. An instrument for measuring the mass flow rate of solids suspended in a gas being transported through a conduit comprising:

transmitter means for generating packets of ultrasound energy, receiver means for detecting the signal strength of said packets of ultrasound energy, said receiver means spaced from said transmitter means such that said ultrasound packets travel across said conduit, and said signal strength is influenced by the concentration of said solids and the velocity of said gas in said conduit, variable positioning means for changing the relationship between said transmitter means and said receiver means in a manner that enables sensing of the downstream drift of said ultrasound packets whereby the velocity of said gas in said conduit may be determined, gated peak analyzer means for determining a maximum signal strength value or an individual packet of said ultrasound energy including resetting means for resetting said gated peak analyzer means after each of said maximum signal strength is determined such that said maximum signal strength values for each of said individual packets is independent of each other, and controlling and processing means for setting said relationship between said transmitter means and said receiver means at first relationship, causing said transmitter means to generate a plurality of said packets of ultrasound energy, the signal strength of said beam received by said receiver storing said maximum signal strength values from said gated peak analyzer means for each of said individual packets of ultrasound energy, calculating a value representative of said maximum signal strength values, storing a value representative of said first relationship and said value representative of said maximum signal strength values, setting said relationship between said transmitter means and said receiver means at a plurality of other relationships, thereby generating values representative of said maximum signal strength values for each of said relationships, calculating the gas velocity and coal loading from said values representative of said relationships and said values representative of said maximum signal strength values.

2. The instrument according to claim 1 wherein said transmitter means is fixed relative to said conduit and said receiver means is positioned opposite said transmitter means and across said conduit, said receiver means being movable in a direction parallel to the longitudinal axis of said conduit.

3. The instrument according to claim 2 wherein said variable positioning means comprises a stepper motor drive coupled to said receiver means which positions said receiver means.

4. The instrument according to claim 1 wherein said receiver means is fixed relative to said conduit and said transmitter means is positioned opposite said receiver means and across said conduit, said transmitter means being movable in a direction parallel to the longitudinal axis of said conduit.

5. The instrument according to claim 4 wherein said variable positioning means comprises a stepper motor drive coupled to said transmitter means which positions said transmitter means.

6. The instrument according to claim 1 wherein said packet of ultrasound energy includes a plurality of individual waves.

7. The instrument according to claim 1 wherein said packets of ultrasound energy have a frequency of about 460 kHz.

8. The instrument according to claim 1 wherein said controlling and processing means calculates the loading of said solids by evaluating the difference between the level of the received signal strength when said solids are present at the relationship between said transmitter means and said receiver means where said value representative of said maximum values is at a maximum, and a calibration value of the received signal strength when said solids are not present when said transmitter means and said receiver means are at said relationship where said value representative of said maximum signal strength values is at a maximum.

9. The instrument according to claim 1 which further enables the temperature of said gas to be determined, further comprising timer means for detecting a period of time related to the rate of propagation of said ultrasound beam within said conduit.

10. An instrument for measuring the mass flow rate of solids suspended in a gas being transported through a conduit coprising:

computer means programmed for solving equations of flow, doing numerical analysis and controlling the overall function of said instrument, transmitter means for generating packets of ultrasound energy, receiver means for detectng the signal strength of said packets of ultrasound energy, said receiver means spaced from said transmitter means whereby said ultrasound packets travel across said conduit, and said signal strength is influenced by the concentration of said solids and the velocity of said gas in said conduit, a receiver amplifier for amplifying said signal strengths of said packets detected by said receiver means, variable positioning means for changing the relationship between said transmitter means and said receiver means in a manner that enables the sensing of the downstream drift of said ultrasound packets whereby the velocity of said gas in said conduit may be determined, controller means for controlling said variable positioning means in response to signals from said computer means and for setting said transmitter means and said receiver means at a plurality of different relationship values, gated peak analyzer means for determining a maximum signal strength value from said receiver means for an individual packet of said ultrasound energy including resetting means for resetting said gated peak analyzer means after each of said individual packets of ultrasound energy are analyzed such that said maximum signal strength values for each of said individual packets are independent of each other, an analog to digital converter for converting said maximum signal strength values for each of said individual packet to digital form, processing means for receiving a plurality of said maximum signal strength values for said individual ultrasound packets and generating a value representative of said plurality of said maximum signal strength values when said transmitter means and said receiver means are at a particular relationship, digital memory means for storing a relationship value of said transmitter means and said receiver means and said value representative of said plurality of said maximum signal strength values when said transmitter means and said receiver means are at said relationship, and timer means for providing timing signals for said power amplifier and said gated peak analyzer means, wherein said instrument provides an output representing said mass flow rate of solids using said values representative of said plurality of said maximum signal strength values and said relationship values.

11. The instrument according to claim 10 wherein said instrument further enables the temperature of said gas to be determined wherein said timer means detects a period of time related to the rate of propagation of said ultrasound beam within said conduit.

12. A method of measuring the mass flow rate of solids suspended in a gas being transported through a conduit using a device having an ultrasonic transmitter and an ultrasonic receiver, said transmitter and receiver positioned such that packets of ultrasonic energy are transmitted across said conduit, said devices further having means for varying the relationship between said transmitter and receiver in a manner that senses the downstream drift of said packets of energy, said method comprising the steps of:

(a) positioning said transmitter and said receiver at a first relationship;

(b) driving said transmitter to generate a plurality of packets of ultrasound energy;

(c) amplifying by a known amount in a receiver amplifier a signal representative of the received packet of ultrasound energy;

(d) processing each said signal from said receiver amplifier by a gated peak analyzer to determine the maximum signal strength value received by said receiver for an individual packet of said ultrasound energy and resetting said gated peak analyzer after determining the maximum signal strength for said individual packets such that each of said maximum signal strength values determined for said individual packets is independent of each other;

(e) storing each said value of maximum signal strength received at said relationship in a digital memory;

(f) processing the plurality of signals from said gated peak analyzer using numerical techniques to provide a value representative of the signal strength processed by said gated peak analyzer at said first relationship;

(g) storing said value representative of said signal strengths and a value represenative of said first relationship;

(h) changing the relationship of said receiver and transmitter from said first relationship to a plurality of other relationships;

(i) repeating steps (b) through (g) with said receiver and transmitter at said other relationships;

(j) using the stored values representative of said maximum signal strength at each said relationship and values corresponding to said relationships and using numerical techniques determine the relationship where maximum signal strength occurs and from said relationship calculate the gas velocity;

(k) using the stored values representative of said maximum signal strengths using numerical techniques calculate a value of maximum signal strength and from this value determine coal loading;

(l) from said gas velocity and said coal loading, calculate mass flow rate.

13. The method according to claim 12 wherein said transmitter and said receiver are positioned opposite one another and one of said transmitter or said receiver is moved in a direction parallel to the longitudinal axis of said conduit, thereby changing said relationship between said transmitter and said receiver.

14. The method according to claim 12 wherein said value representative of the maximum signal strength values processed by said gated peak analyzer is an average value of said plurality of maximum signal strength values.

15. The method according to claim 12 wherein said calculating the solids loading step comprises comparing the level of the received signal strength when said solids are present at the relationship between said transmitter and said receiver where said signal strength is at a maximum, and a calibration value of the received signal strength when said solids are not present when said transmitter and said receiver are at said relationship where said signal strength is at a maximum.

16. The method according to claim 12 further enabling the temperature of said gas to be measured further comprising the step of measuring a period of time related to the rate of propagation of said ultrasound beam within said conduit.

* * * * *

UNITED STATES PATENT AND TRADEMARK OFFICE
CERTIFICATE OF CORRECTION

PATENT NO. : 4,726,235              Page 1 of 4
DATED      : February 23, 1988
INVENTOR(S): Charles B. Leffert et al It is certified that error appears in the above-identified patent and that said Letters Patent is hereby corrected as shown below:

Column 3, lines 56-57, after "operation", insert --, respectively--.

Column 4, line 16, "$c_m) = \alpha$" should be --$c_m) = \alpha_g$--.

Column 4, line 46, after "average" insert --gas--.

Column 4, line 46, after "is" delete "known. The coefficient $\alpha_g$ is known since it is characteristic of the gas; $\alpha_{tot}$ is also known since it is a directly measured value, and $\alpha_t$ is known once the average gas velocity ($U_d$) is".

Column 5, line 1, "$\alpha$" should be --$\hat{\alpha}$--.

UNITED STATES PATENT AND TRADEMARK OFFICE
CERTIFICATE OF CORRECTION

PATENT NO. : 4,726,235
DATED : February 23, 1988
INVENTOR(S) : Charles B. Leffert et al It is certified that error appears in the above-identified patent and that said Letters Patent is hereby corrected as shown below:

Column 5, lines 2-3, "10)$\alpha(m^-)$
    should be --10)$\alpha(m^{-1})$--.

Column 7, line 21, "by" should
    be --to--.

Column 7, line 25, after
    "greater" insert --detail--.

Column 7, line 34, "grated"
    should be --gated--.

Column 7, line 36, "iplemented"
    should be --implemented--.

Column 8, line 19, "(VSI)"
    should be --(VLSI)--.

Column 8, line 27, "receiver"
    should be --transceiver--.

Column 8, line 33, "triggere"
    should be --triggered--.

UNITED STATES PATENT AND TRADEMARK OFFICE
CERTIFICATE OF CORRECTION

PATENT NO. : 4,726,235

DATED : February 23, 1988

INVENTOR(S) : Charles B. Leffert et al

It is certified that error appears in the above-identified patent and that said Letters Patent is hereby corrected as shown below:

Column 10, line 40,     "harmonica"
    should be --harmonics--.

Column 10, line 46,     "oscilator"
    should be --oscillator--.

Column 13, line 28,
    "caluculated" should be --calculated--.

Column 14, line 35,

"$\alpha'(U_d, C_m = 0))$" should be --$\alpha'(U_d, C_m$ 0))--.

Column 15, line 14,     after "strength"
    insert --values--.

Column 15, line 20,     after "at" insert
    --a--.

Column 15, line 22,     delete "the
    signal strength of said beam received by said receiver".

UNITED STATES PATENT AND TRADEMARK OFFICE
CERTIFICATE OF CORRECTION

PATENT NO. : 4,726,235

DATED : February 23, 1988

INVENTOR(S) : Charles B. Leffert et al

It is certified that error appears in the above-identified patent and that said Letters Patent is hereby corrected as shown below:

Column 16, line 16 (Claim 10) "coprising" should be --comprising--.

Column 16, line 22 (Claim 10) "detectng" should be --detecting--.

Column 16, line 42 (Claim 10), after line 42 insert the following paragraph: --a power amplifier for supplying a pulsed signal to said transmitter means causing said transmitter means to emit said packets of ultrasound energy,--.

Column 18, line 2 (Claim 12), "represenative" should be --representative--.

Signed and Sealed this

Fourteenth Day of May, 1991

Attest:

HARRY F. MANBECK, JR.

Attesting Officer

Commissioner of Patents and Trademarks